US012211456B2

(12) United States Patent
Tann et al.

(10) Patent No.: US 12,211,456 B2
(45) Date of Patent: Jan. 28, 2025

(54) RGB PIXEL CONTRAST CONTROL SYSTEMS AND METHODS

(71) Applicant: Apple Inc., Cupertino, CA (US)

(72) Inventors: Christopher P Tann, San Jose, CA (US); Mahesh B Chappalli, San Jose, CA (US); Alexey Kornienko, Watford (GB)

(73) Assignee: Apple Inc., Cupertino, CA (US)

(*) Notice: Subject to any disclaimer, the term of this patent is extended or adjusted under 35 U.S.C. 154(b) by 247 days.

(21) Appl. No.: 17/934,570

(22) Filed: Sep. 22, 2022

(65) Prior Publication Data

US 2024/0105131 A1 Mar. 28, 2024

(51) Int. Cl.
*G09G 3/34* (2006.01)

(52) U.S. Cl.
CPC ........... *G09G 3/3413* (2013.01); *G09G 3/342* (2013.01); *G09G 2310/08* (2013.01); *G09G 2320/0242* (2013.01); *G09G 2320/066* (2013.01); *G09G 2320/0666* (2013.01); *G09G 2320/0686* (2013.01)

(58) Field of Classification Search
CPC .... G09G 3/3413; G09G 3/342; G09G 3/3426; G09G 3/3607; G09G 2310/08; G09G 2320/0242; G09G 2320/066; G09G 2320/0666; G09G 2320/0686
See application file for complete search history.

(56) References Cited

U.S. PATENT DOCUMENTS

| | | | | |
|---|---|---|---|---|
| 9,373,178 | B2 * | 6/2016 | Gilbert | G02F 1/133514 |
| 9,704,274 | B2 * | 7/2017 | Gilbert | G06T 11/001 |
| 10,269,308 | B2 * | 4/2019 | Yang | G09G 3/3607 |
| 10,522,095 | B2 * | 12/2019 | Yata | G09G 3/3208 |
| 2012/0194578 | A1 | 8/2012 | Znamenskiy et al. | |
| 2013/0215360 | A1 | 8/2013 | Pollack et al. | |
| 2014/0049571 | A1 * | 2/2014 | Erinjippurath | G09G 3/3607 345/690 |
| 2014/0192078 | A1 * | 7/2014 | Gilbert | G09G 3/3406 345/590 |
| 2016/0275877 | A1 | 9/2016 | Fan | |
| 2017/0024906 | A1 * | 1/2017 | Gilbert | G02F 1/133514 |
| 2017/0061903 | A1 * | 3/2017 | Yata | G09G 3/3607 |
| 2017/0084232 | A1 * | 3/2017 | Yang | G09G 3/3426 |
| 2019/0103047 | A1 * | 4/2019 | Chung | G09G 3/3607 |

* cited by examiner

*Primary Examiner* — Michael Pervan
(74) *Attorney, Agent, or Firm* — Fletcher Yoder P.C.

(57) ABSTRACT

A device may include an electronic display to display an image frame based on first and second color component input image data. The electronic display may include a first illuminator to generate a first light at a first brightness level, a second illuminator to generate a second light of a different color at a second brightness level, a first set of pixel locations to emit the first light based on a first set of pixel values, and a second set of pixel locations to emit the second light based on a second set of pixel values. The electronic device may also include pixel contrast control circuitry that determines the first brightness level and the first set of pixel values based on the first color component input image data and determines the second brightness level and the second set of pixel values based on the second color component input image data.

20 Claims, 7 Drawing Sheets

RGB PIXEL CONTRAST CONTROL SYSTEMS AND METHODS

BACKGROUND

The present disclosure relates generally to displayed image processing and, more particularly, to managing pixel contrast control for displays with multi-color illuminators.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data. Moreover, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer.

In other words, an image to be displayed may be represented by processed image data defining luminance values for pixels of the display, and the pixels may use the luminance values to augment a portion of the light generated by an illuminator to emit light that, in the aggregate, form the image. For example, an illuminator (e.g., backlight or projector) may generate light for several different pixels, and each pixel may allow a portion of the generated light to be emitted based on a luminance value of the image data corresponding to the pixel. However, illuminators may consume a considerable amount of power (e.g., relative to processing circuitry and/or the pixel circuitry), but simply reducing the light output from the illuminator(s) may result in a decrease in perceived contrast and/or image quality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with embodiments of the present disclosure, it may be desirable to reduce the amount of light generated at the illuminator(s), thus increasing efficiency, while preserving contrast. In general, illuminators (e.g., backlights or projectors) may generate light for several different pixels, and each pixel may allow a portion of the generated light to be emitted based on a luminance value of the image data corresponding to the pixel. In accordance with embodiments of the present disclosure, the amount of light generated at the illuminator(s) may be reduced, thus increasing power efficiency, while preserving contrast by increasing/adjusting the pixel luminance values to offset the reduced illuminator outputs. More specifically, in some embodiments, an electronic display may include illuminators for multiple different color components (e.g., a red illuminator, a green illuminator, a blue illuminator, etc.), and the light generated by each of the different color illuminators may be directed (e.g., via a light guide, one or more mirrors, via one or more color filters, etc.) to the pixels of the electronic display. As should be appreciated, such electronic displays may include reflective technology displays (e.g., digital micro-mirror displays (DMDs), ferroelectric-liquid-crystal-on-silicon (FLCOS) display, etc.), liquid crystal displays (LCDs) having individually controlled color component backlights, or any suitable electronic display having individually controlled color component illuminators. For example, a reflective technology display may have individually controlled color component illuminators that provide light to multiple pixels of the display panel via one or more reflective components (e.g., mirrors, light guides, etc.). Furthermore, the pixels may regulate (e.g., pulse-width modulate) the amount of time (e.g., duty cycle) that the pixel is actively allowing light to be transmitted through and emitted from the pixels according to a luminance value of the image data.

To facilitate reducing power consumption of the illuminators while improving/maintaining perceived image quality (e.g., contrast), pixel contrast control (PCC) circuitry may be utilized (e.g., as a portion of image processing circuitry of a display pipeline) to reduce the individual outputs of the different color components of the illuminators, and modify the luminance values of the pixels to compensate for the reduction. For example, a PCC block of the image processing circuitry may determine pixel statistics, which may be indicative of the pixel luminance and color hues of the image. In some embodiments, the pixel statistics may be used to determine the maximum luminance values for each color component, and the maximum luminance values may be used to set the reduced value of the corresponding color component illuminator. For example, if the maximum red pixel luminance value of an image frame is 150/255, instead of operating the red illuminator at full brightness and the pixel corresponding to the maximum luminance value at a duty cycle corresponding to a luminance of 150/255, the duty cycle of the pixel (and associated image data) may be increased (e.g., to 255/255 or another level between 150 and 255), and the light output of the red illuminator may be reduced such that the total light emitted from the pixel over the increased duty cycle is equivalent to the 150/255 luminance value. In this manner, the light generated (e.g., brightness) by each color component illuminator and, therefore, the power consumption of the illuminators may be reduced based on the maximum luminance values for each respective color component.

Additionally, in some embodiments, the luminance values of the pixels may be compensated for a white-point correction due to the change in the amount of light generated by each illuminator. For example, the illuminators may have a color shift (e.g., linear or non-linear) associated with the change in brightness (e.g., amount of light generated). Moreover, as the brightness levels for each of the illuminators are decreased, the color shift may become more pronounced. As such, the PCC block may generate a white-point correction to adjust the color hue of the pixels based on the changed illuminator brightness levels to compensate for the color shift. As should be appreciated, the color shift may vary based on implementation (e.g., type of illuminators, color component of the illuminators, operating environment, etc.).

Additionally, in some embodiments, different color component illuminators may have different efficiencies when operated at various brightness levels. For example, a green illuminator may draw less power when operating at the same brightness level as a red illuminator. As such, a user interface for an electronic device may be designed with lower maximum luminance values for color components of the less efficient illuminators, which may further increase power savings.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
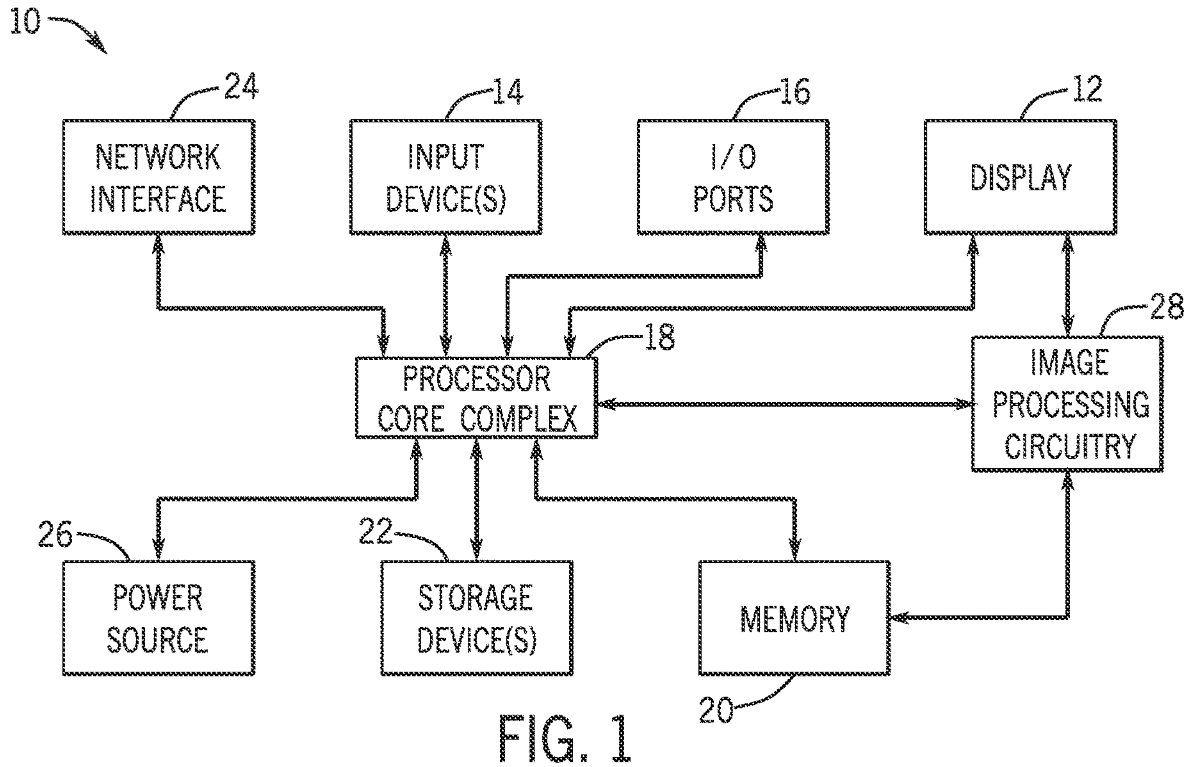
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer.

In some embodiments, the electronic display may include illuminators (e.g., backlights or projectors) that generate light for several different pixels, and each pixel may allow a portion of the generated light to be emitted based on a luminance value of the image data corresponding to the pixel. More specifically, in some embodiments, an electronic display may include illuminators for multiple different color components (e.g., a red illuminator, a green illuminator, a blue illuminator, etc.), and the light generated by each of the different color illuminators may be directed (e.g., via a light guide, one or more mirrors, via one or more color filters, etc.) to the pixels of the electronic display. As should be appreciated, such electronic displays may include reflective technology displays (e.g., digital micro-mirror displays (DMDs), ferroelectric-liquid-crystal-on-silicon (FLCOS) display, etc.), liquid crystal displays (LCDs) having individually controlled color component backlights, or any suitable electronic display having individually controlled color component illuminators. For example, a reflective technology display may have individually controlled color component illuminators that provide generated light to multiple pixels of the display panel via one or more reflective components (e.g., mirrors, light guides, etc.). Furthermore, the pixels may regulate (e.g., pulse-width modulate) the amount of time (e.g., duty cycle) that the pixel is actively allowing light to be transmitted through and emitted from the pixels according to a luminance value of the image data. For example, the amount of time that the pixel is actively allowing light to be transmitted per period (e.g., image frame) may result in a temporal average that a viewer perceives as the equivalent of the brightness level associated with the luminance value of the image data.

To facilitate reducing power consumption of the illuminators while improving/maintaining perceived image quality (e.g., contrast), pixel contrast control (PCC) circuitry may be utilized (e.g., as a portion image processing circuitry of a display pipeline) to reduce the individual outputs of the different color components of the illuminators, and modify the luminance values of the pixels to compensate for the reduction. For example, a PCC block of the image processing circuitry may determine pixel statistics that are indicative of the pixel luminance and color hues of the image. In some embodiments, the pixel statistics may include local pixel statistics gathered based on local windows (e.g., cells) defined in an image frame and/or global pixel statistics based on an active region defined in the image frame. As non-limiting example, such pixel statistics may include the maximum color component values, average values, histograms of the luminance values, and/or individual luminance values of each image pixel.

In some embodiments, the pixel statistics may be used to determine the maximum luminance values for each color component, and the maximum luminance values may be used to set the reduced value of the corresponding color component illuminator. For example, if the maximum red pixel luminance value of an image frame is 150/255, instead of operating the red illuminator at full brightness and the pixel corresponding to the maximum luminance value at a duty cycle corresponding to a luminance of 150/255, the duty cycle (or other pixel output) of the pixel (and associated image data) may be increased (e.g., to 255/255 or another level between 150 and 255), and the light output of the red illuminator may be reduced such that the total light emitted from the pixel over the increased duty cycle (or other pixel output) is equivalent to the 150/255 luminance value. Moreover, values of other pixels of the image frame may be similarly compensated for the decreased light output of the illuminator. In this manner, the light generated (e.g., brightness) by each color component illuminator and, therefore, the power consumption of the illuminators may be reduced based on the maximum luminance values for each respective color component.

Additionally, in some embodiments, the luminance values of the pixels may be compensated for a white-point correction due to the change in the amount of light generated by each illuminator. For example, in some scenarios, the illuminators may have a color shift (e.g., linear or non-linear color change) associated with the change in brightness (e.g., amount of light generated). In other words, as the brightness level of the illuminator is decreased, the output color hue of the illuminator may change. Moreover, as the brightness levels for each of the illuminators may be decreased, the color shift may become more pronounced. As such, the PCC block may generate a white-point correction to adjust the color hue of the pixels and, thus, the luminance values of the image data based on the changed illuminator brightness levels to compensate for the color shift. As should be appreciated, the color shift may vary based on implementation (e.g., type of illuminators, color component of the illuminators, operating environment, etc.).

Additionally, in some embodiments, different color component illuminators may have different efficiencies when operated at various brightness levels. For example, a green illuminator may draw less power when operating at the same brightness level as a red illuminator. As such, a user interface for an electronic device may be designed with lower maximum luminance values for color components of the less efficient illuminators. For example, if the red illuminator is less efficient than the green and blue illuminators, the user interface may be designed with, on average, lower maximum red luminance values than the maximum blue and green luminance values. In other words, the user interface may be designed such that the red illuminator is, on average, operated at a lower brightness level than other illuminators, which may further increase power savings.

With the foregoing in mind, FIG. 1 is an example electronic device 10 with an electronic display 12 having independently controlled color component illuminators (e.g., projectors, backlights, etc.). As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline, etc.) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include cache memory or random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
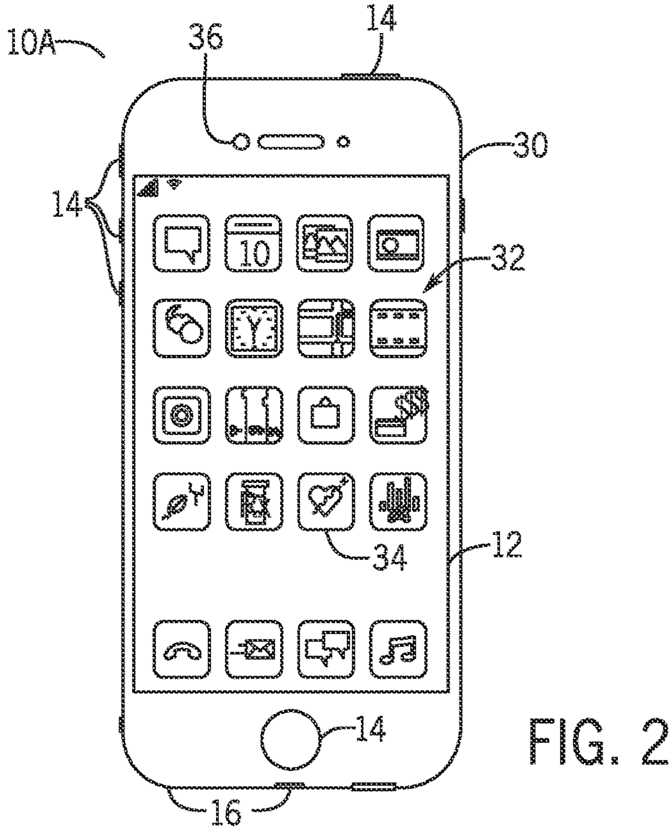
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as an iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
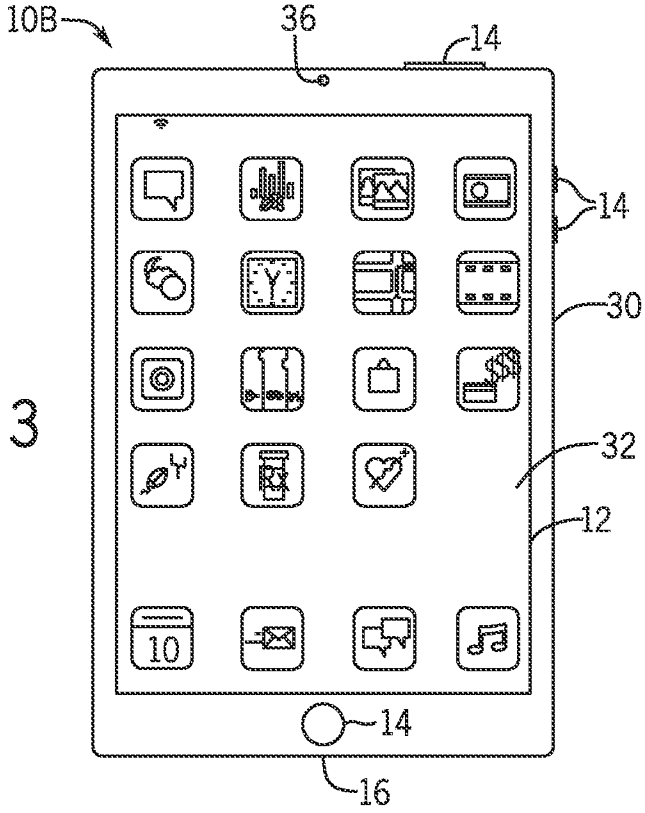
FIG. 3 is another example of the electronic device of FIG. 1 in the form of a tablet device, in accordance with an embodiment.
Figure 4:
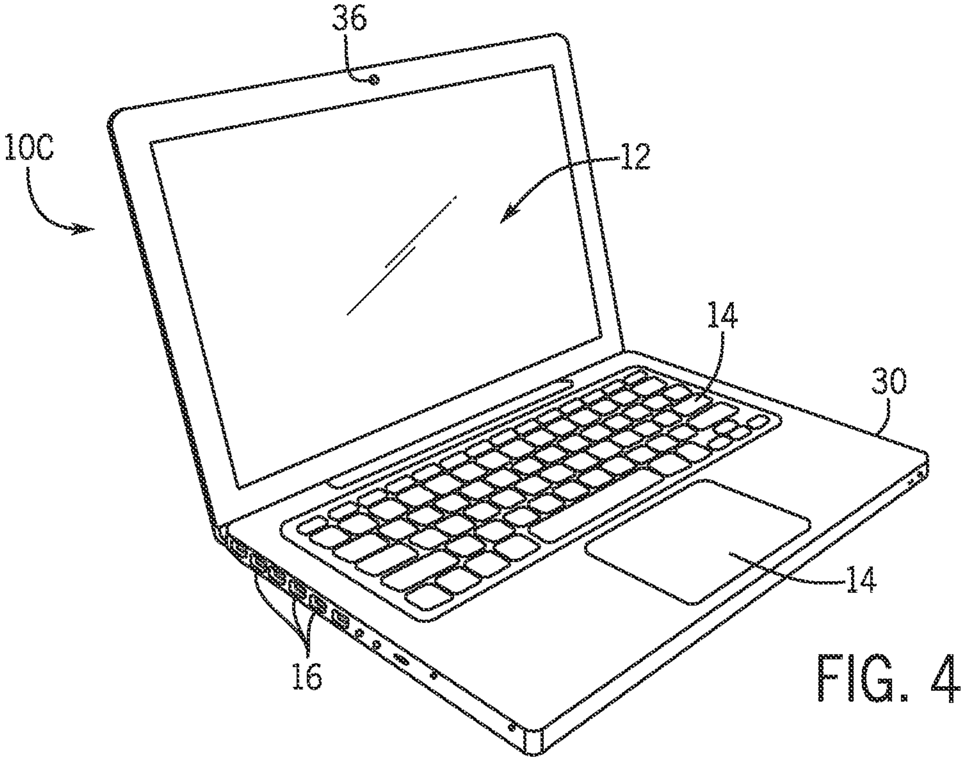
FIG. 4 is another example of the electronic device of FIG. 1 in the form of a computer, in accordance with an embodiment.
Figure 5:
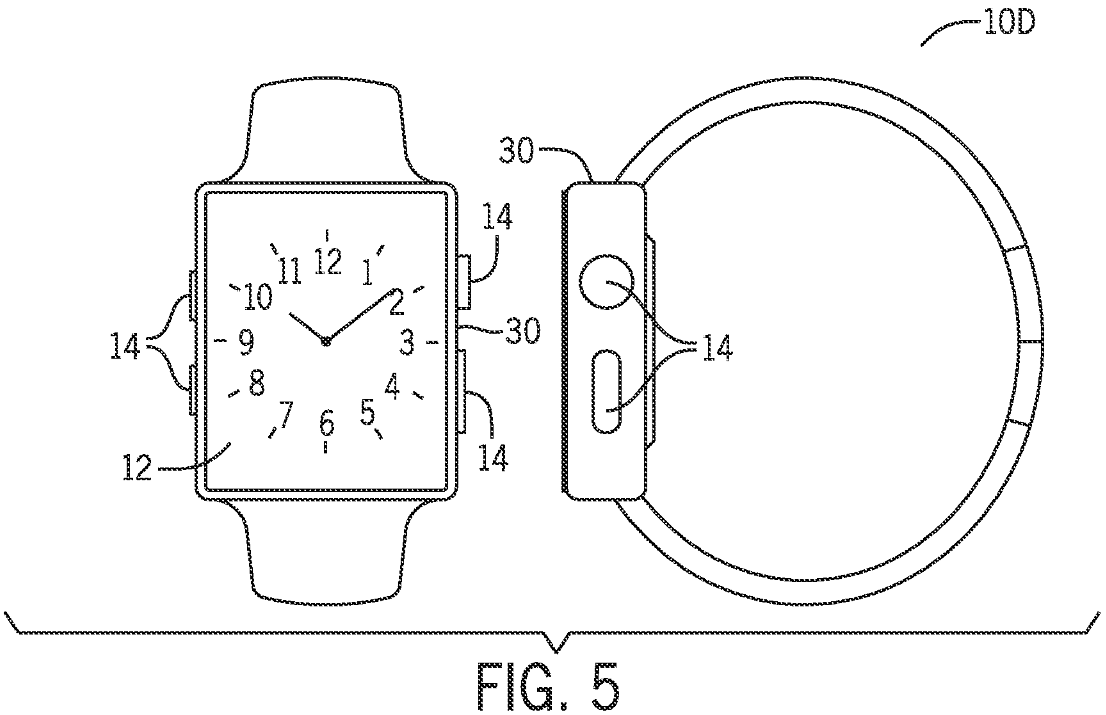
FIG. 5 is another example of the electronic device of FIG. 1 in the form of a watch, in accordance with an embodiment.

Another example of a suitable electronic device 10, specifically a tablet device 10B, is shown in FIG. 3. For illustrative purposes, the tablet device 10B may be an iPad® model available from Apple Inc. A further example of a suitable electronic device 10, specifically a computer 10C, is shown in FIG. 4. For illustrative purposes, the computer 10C may be a MacBook® or iMac® model available from Apple Inc. Another example of a suitable electronic device 10, specifically a watch 10D, is shown in FIG. 5. For illustrative purposes, the watch 10D may be an Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 6:
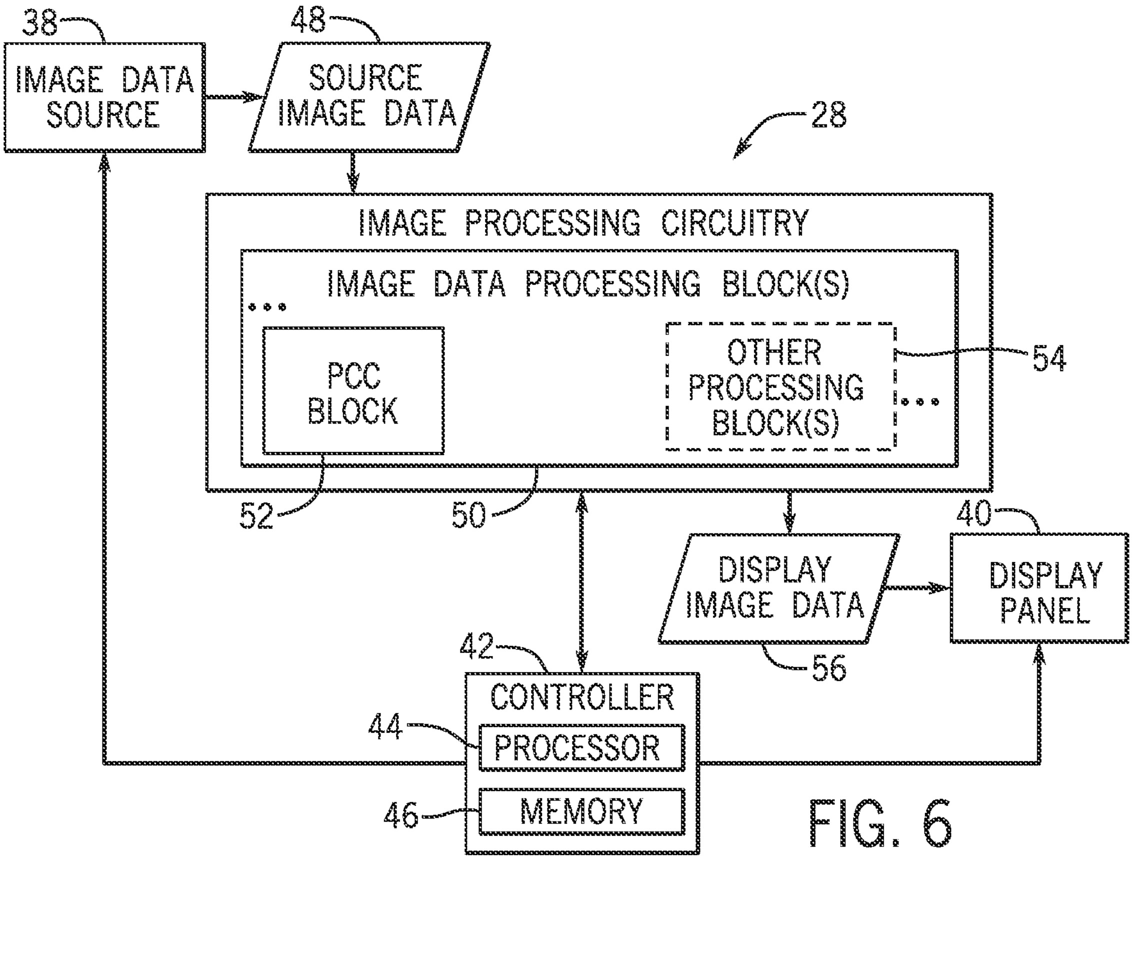
FIG. 6 is a block diagram of the image processing circuitry of FIG. 1 including a pixel contrast control (PCC) block, in accordance with an embodiment.

To help illustrate, a portion of the electronic device 10, including image processing circuitry 28, is shown in FIG. 6. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an aRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a pixel contrast control (PCC) block 52. As should be appreciated, multiple other processing blocks 54 may also be incorporated into the image processing circuitry 28, such as a color management block, a dither block, a burn-in compensation (BIC) block, a scaling/rotation block, etc. before and/or after the PCC block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

In some embodiments, the PCC block 52 may process image data to augment the display image data 56 such that one or more illuminators of the display panel 40 are operated at a reduced brightness level, for example to save power. For example, the PCC block 52 may reduce the brightness level of an illuminator, and modify the luminance values of the pixels to compensate for the reduction. Moreover, in some embodiments, the display panel 40 may include illuminators for multiple different color components (e.g., a red illuminator, a green illuminator, a blue illuminator, etc.), and the PCC block 52 may regulate the brightness level of each color component illuminator individually. Light generated by each of the different color illuminators may be directed (e.g., via a light guide, one or more mirrors, via one or more color filters, etc.) to the pixels of the electronic display. As should be appreciated, such electronic displays may include reflective technology displays (e.g., digital micro-mirror displays (DMDs), ferroelectric-liquid-crystal-on-silicon (FLCOS) display, etc.), liquid crystal displays (LCDs) having individually controlled color component backlights, or any suitable electronic display having individually controlled color component illuminators. For example, a reflective technology display may have individually controlled color component illuminators that provide generated light to multiple pixels of the display panel via one or more reflective components (e.g., mirrors, light guides, etc.). Furthermore, the pixels may regulate (e.g., pulse-width modulate) the amount of time (e.g., duty cycle) that the pixel is actively allowing light to be transmitted through and emitted from the pixels for a given period (e.g., image frame/cycle) according to a luminance value of the image data.

Figure 7:
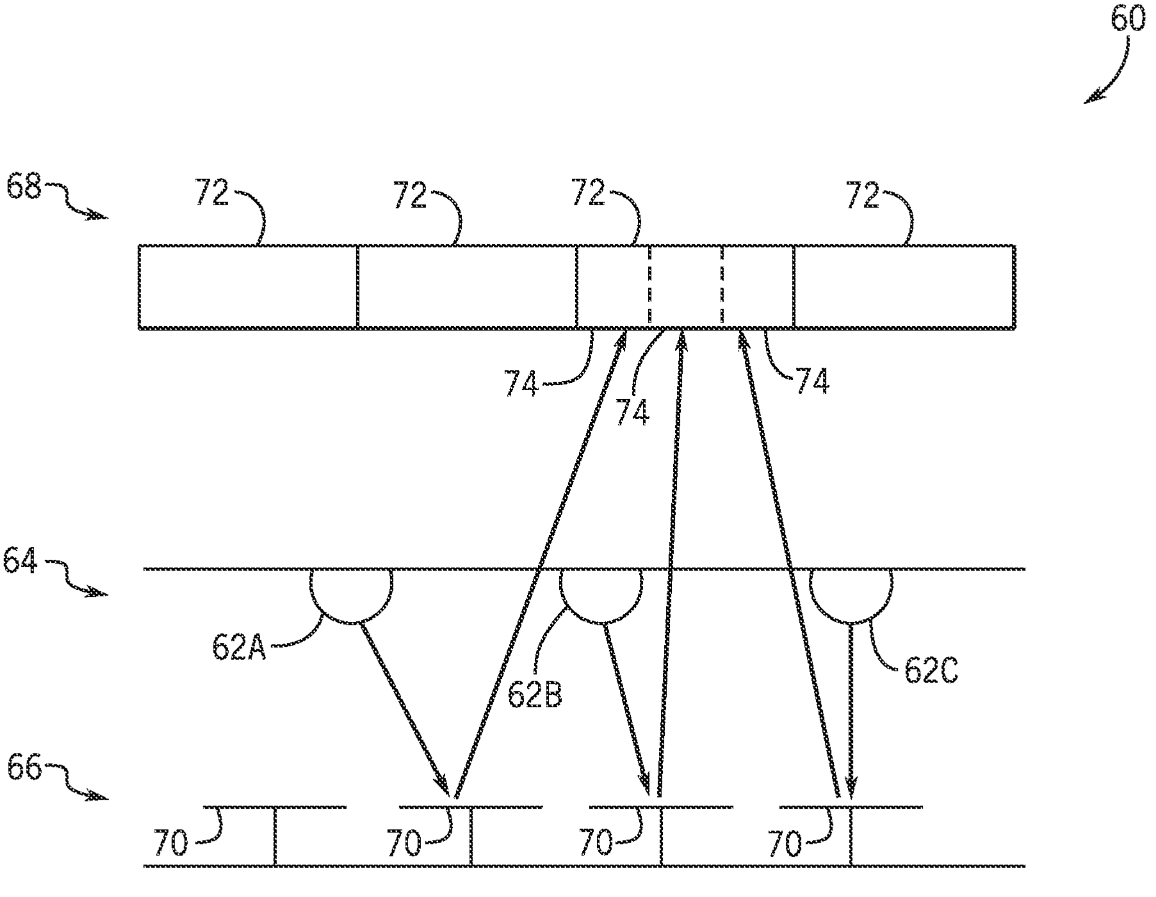
FIG. 7 is a schematic view of an example reflective technology display having different color component illuminators, in accordance with an embodiment.
Figure 8:
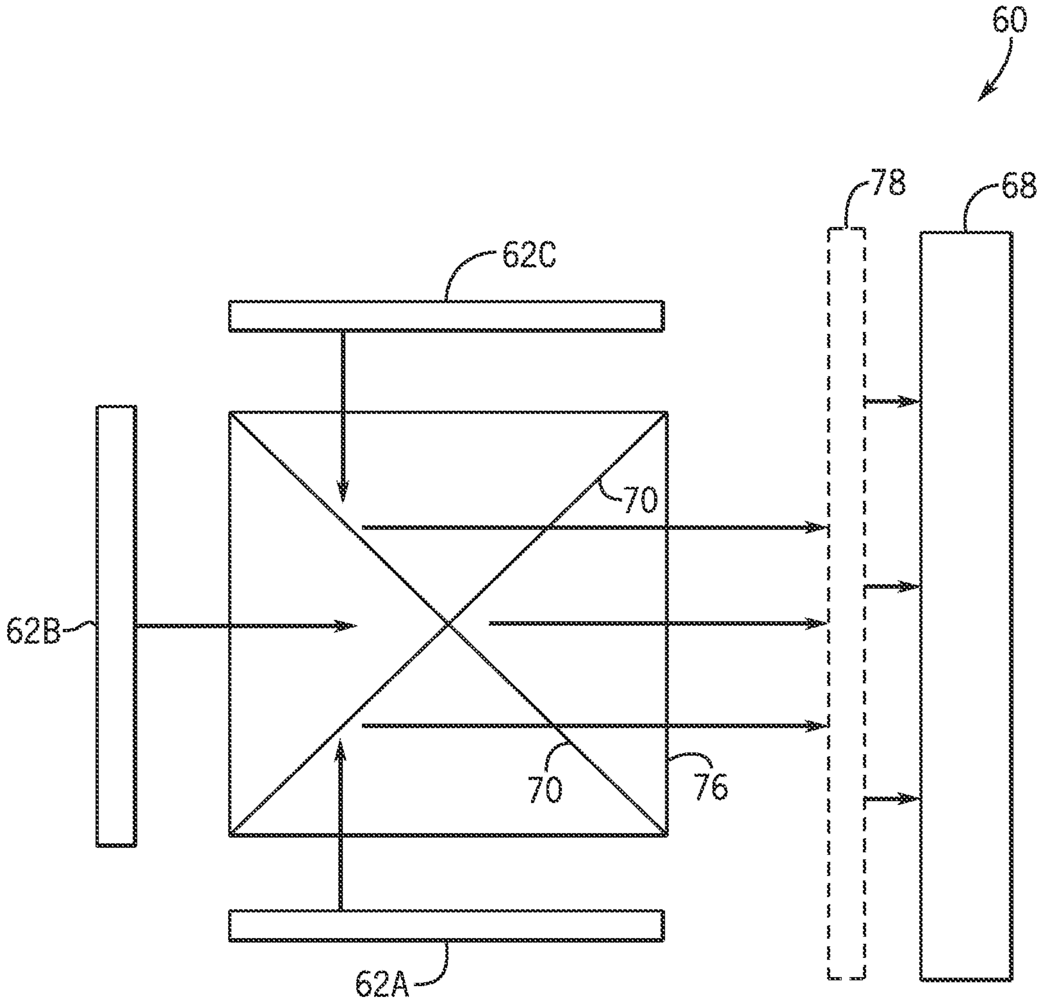
FIG. 8 is a schematic view of an example reflective technology display having different color component illuminators, in accordance with an embodiment.

To help illustrate, FIGS. 7 and 8 are schematic views of example reflective technology displays 60 having different color component illuminators 62. In some embodiments, a reflective technology display 60 may include an illuminator layer 64, a reflective layer 66, and a pixel layer 68, as in FIG. 7. For example, the illuminator layer 64 may include different color component illuminators 62 (e.g., a red illuminator 62A, a green illuminator 62B, and a blue illuminator 62C, collectively 62) that generate light in their respective color. The reflective layer 66 may include one or more mirrors 70 that reflect the light generated by the illuminators 62 to one or more pixel positions 72 of the pixel layer 68. At each pixel position 72, the light generated by the illuminators 62 may be visible on the electronic display 12 according to the display image data 56. For example, the mirrors 70 may reflect a portion of the generated light to a pixel position 72 for a certain duty cycle to provide a particular luminance level for an image frame. Additionally or alternatively, the pixel positions 72 may include active pixels that limit the amount of light passing therethrough (e.g., based on the display image data 56). Moreover, in some embodiments, the pixel positions 72 may be conceptualized by the individual color components as sub-pixel positions 74.

Additionally or alternatively, the illuminators 62 may project light to a set of multiple mirrors 70 (e.g., a mirror array 76) and be further directed to the pixel positions 72 of the pixel layer 68 via a light guide 78, as in FIG. 8. Moreover, in some embodiments, different color illuminators 62 may generate light on different sides of the mirror array 76, and the mirror array 76 may direct the generated light in a single direction to the viewed portion of the pixel layer 68 with or without the light guide 78. Although shown as a unidirectional light guide 78, as should be appreciated, the light guide 78 may direct the light from the mirror array 76 in any suitable direction to be viewed at the corresponding pixel locations 72 on the electronic display 12.

Figure 9:
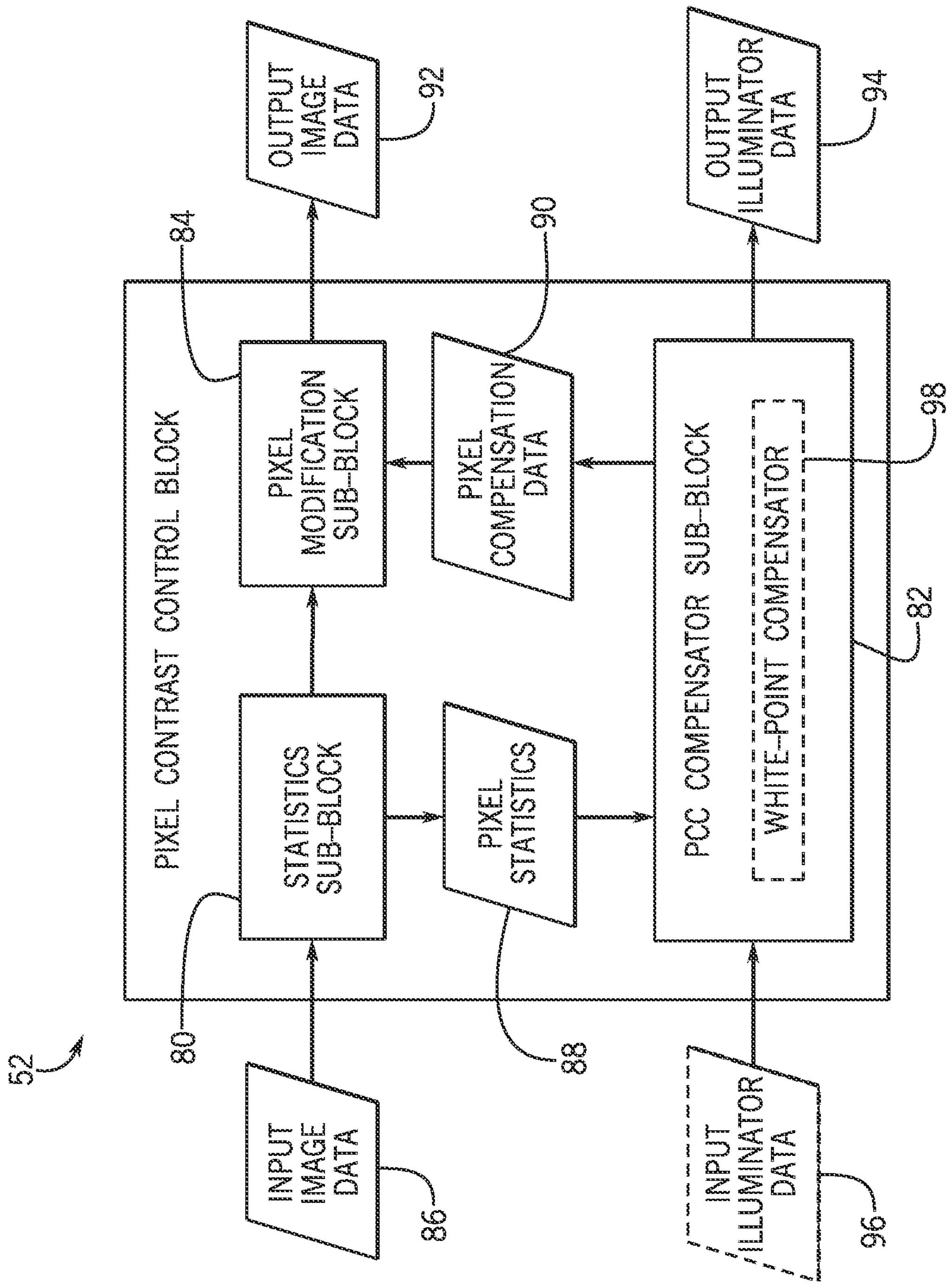
FIG. 9 is a block diagram of the PCC block of FIG. 6, in accordance with an embodiment.

To facilitate reducing power consumption of the illuminators 62 while improving/maintaining perceived image quality (e.g., contrast), the PCC block 52 may include a statistics sub-block 80, a PCC compensator sub-block 82, and/or a pixel modification sub-block 84, as shown in FIG. 9. As should be appreciated, the sub-blocks are given as examples to enhance discussion and there may or may not be logical or physical distinctions between sub-blocks. In some embodiments, the statistics sub-block 80 may receive input image data 86 and gather pixel statistics 88 based on the input image data 86. As should be appreciated, the input image data 86 may be the source image data 48 or partially processed image data, for example, from other processing blocks 54. The pixel statistics 88 may include local pixel statistics gathered based on local windows (e.g., cells) defined in an image frame and/or global pixel statistics based on an active region defined in the image frame. As non-limiting example, such pixel statistics 88 may include the maximum color component values, average values, histograms of the luminance values, and/or individual luminance values of each image pixel.

The pixel statistics 88 and input image data 86 may be utilized by the PCC compensator sub-block 82 to generate pixel compensation data 90, which may be applied to the input image data 86 (e.g., via the pixel modification sub-block 84) to generate the output image data 92. Moreover, the PCC compensator sub-block 82 may generate output illuminator data 94 to control the brightness levels of the illuminators 62. As such, the PCC block 52 may generate output image data 92 and output illuminator data 94 to provide reduced illuminator brightness levels and, thus, save power.

For example, the input image data 86 for an image frame may be analyzed (e.g., via the statistics sub-block 80) to find the global maximum luminance values for each color component (e.g., the maximum red luminance value, the maximum green luminance value, and the maximum blue luminance value). Furthermore, the PCC compensator sub-block 82 may utilize the maximum luminance values for each color component to set the reduced brightness levels of the illuminators 62 (e.g., via the output illuminator data 94). For example, if the maximum luminance values for a given frame are 0/255 Red, 150/255 Green, and 255/255 Blue, the 0/255 Red maximum luminance level expresses that no red is used in the frame. As such, the PCC block 52 may reduce or turn off completely the red illuminator 62A. Moreover, a maximum luminance value of 150/255 Green may express that the brightness level of the green illuminator 62B may be reduced to the equivalent of a 150/255 Green luminance level. Further, the maximum luminance level of 255/255 Blue may express that the full brightness of the blue illuminator 62C, or at least that corresponding to a luminance level of 255/255, may be set as the brightness level of the blue illuminator 62C (e.g., via the output illuminator data 94). In some embodiments, the PCC compensator sub-block 82 may also receive, or have stored from previous calculations, input illuminator data 96 indicative of the current (e.g., corresponding to a previous image frame than the one being processed) brightness levels of the illuminators 62. In some embodiments, the PCC compensator sub-block 82 may temporally filter changes in the output illuminator data 94 based on the input illuminator data 96 to avoid sudden (e.g., single frame) changes in brightness greater than a threshold (e.g., 10% of the illuminator brightness, 25% of the illuminator brightness, 40% of the illuminator brightness, 50% of the illuminator brightness, 75% of the illuminator brightness, or 100% of the illuminator brightness). Furthermore, as should be appreciated, the luminance values and corresponding brightness levels discussed herein are relative to a global brightness setting (e.g., brightness setting of the electronic display 12), and the brightness levels of the illuminators 62 may be increased or decreased with the global brightness setting while maintaining correspondence with the luminance values.

In addition to setting the brightness levels of the illuminators 62, the PCC compensator sub-block 82 may generate the pixel compensation data 90 to remap the input image data 86 to compensate for the reduced brightness levels of the illuminators 62. Using the previous example having maximum luminance values for a given frame of 0/255 Red, 150/255 Green, and 255/255 Blue, red and blue pixel values may be left unaltered, as red is not used in the image frame, and the blue illuminator is not reduced. However, as the brightness level of the green illuminator 62B has been reduced, the green pixel values may be compensated (e.g., remapped) such that the duty cycle (or other pixel output) of green pixels is increased to offset the reduced brightness level of the green illuminator 62B. For example, green pixels originally having the 150/255 Green value may be remapped to 255/255 (e.g., duty cycle of 100%). As such, a pixel location 72 may output, at 100% duty cycle, the 150/255 Green illuminator output, which is equivalent to the 150/255 pixel value (e.g., duty cycle) at 255/255 Green illuminator output. Additionally, other pixel locations 72 having less than the statistical maximum luminance level (e.g., 150/255 Green) may be remapped to increased luminance values using in the same way. As should be appreciated, the ratio of the remapping may be maintained relative to perceived brightness and may or may not be a linear remapping relative to the input image data 86.

Although discussed above as setting the illuminators 62 to the equivalent of the corresponding color component maximum luminance values, in some embodiments, a buffer may be included such that the illuminators 62 are maintained above equivalent of the maximum luminance values and the output image data 92 includes maximum luminance values less than the absolute maximum luminance values (e.g., 255/255). Returning to the above example having maximum luminance values for a given frame of 0/255 Red, 150/255 Green, and 255/255 Blue, the red illuminator 62A may remain turned on in a reduced power state and/or the green illuminator 62B may be reduced to a brightness level the equivalent of a 175/255 Green luminance value. The buffer may reduce reaction time in the event the brightness of an illuminator 62 is to be increased for a subsequent frame (e.g., having a higher maximum luminance value determined by the statistics sub-block 80).

Additionally or alternatively, the PCC block 52 may compensate the input image data 86 for a white point correction associated with changes in the brightness values of the different color component illuminators 62. For example, in some scenarios, the illuminators 62 may have a color shift (e.g., linear or non-linear color change) associated with the change in brightness (e.g., amount of light generated). In other words, as the brightness level of the illuminator 62 is decreased, the output color hue of the illuminator 62 may change. Moreover, as the brightness levels for each of the illuminators may be decreased, the color shift may become more pronounced as an aggregate of color shifts of each of the different color component illuminators 62. As such, the PCC compensator sub-block 82 may include a white-point compensator 98 that, based on the output illuminator data 94, incorporates a white-point correction into the pixel compensation data 90 to adjust the color hue of the pixels and, thus, the luminance values of the output image data 92 based on the changed illuminator brightness levels to compensate for the color shift. As should be appreciated, the color shift may vary based on implementation (e.g., type of illuminators, color component of the illuminators, operating environment, etc.). In some embodiments, the PCC compensator sub-block 82 may utilize a look-up table, a multi-dimensional look-up table, algorithm, or other processing to generate the white-point correction. Moreover, the white-point correction may be based on the input image data 86 or the increased luminance values corrected for the reduced brightness levels of the illuminators 62. Furthermore, as should be appreciated, the compensations to the input image data 86 (e.g., the white-point correction and the increased luminance values corrected for the reduced brightness levels of the illuminators 62) may be calculated individually and added together or computed together. Moreover, although depicted as having separate pixel compensation data 90 that is combined with the input image data 86 (e.g., via the pixel modification sub-block 84), in some embodiments, the PCC compensator sub-block 82 may directly generate the output image data 92 and the output illuminator data 94 based on the input image data 86 and the pixel statistics 88.

Figure 10:
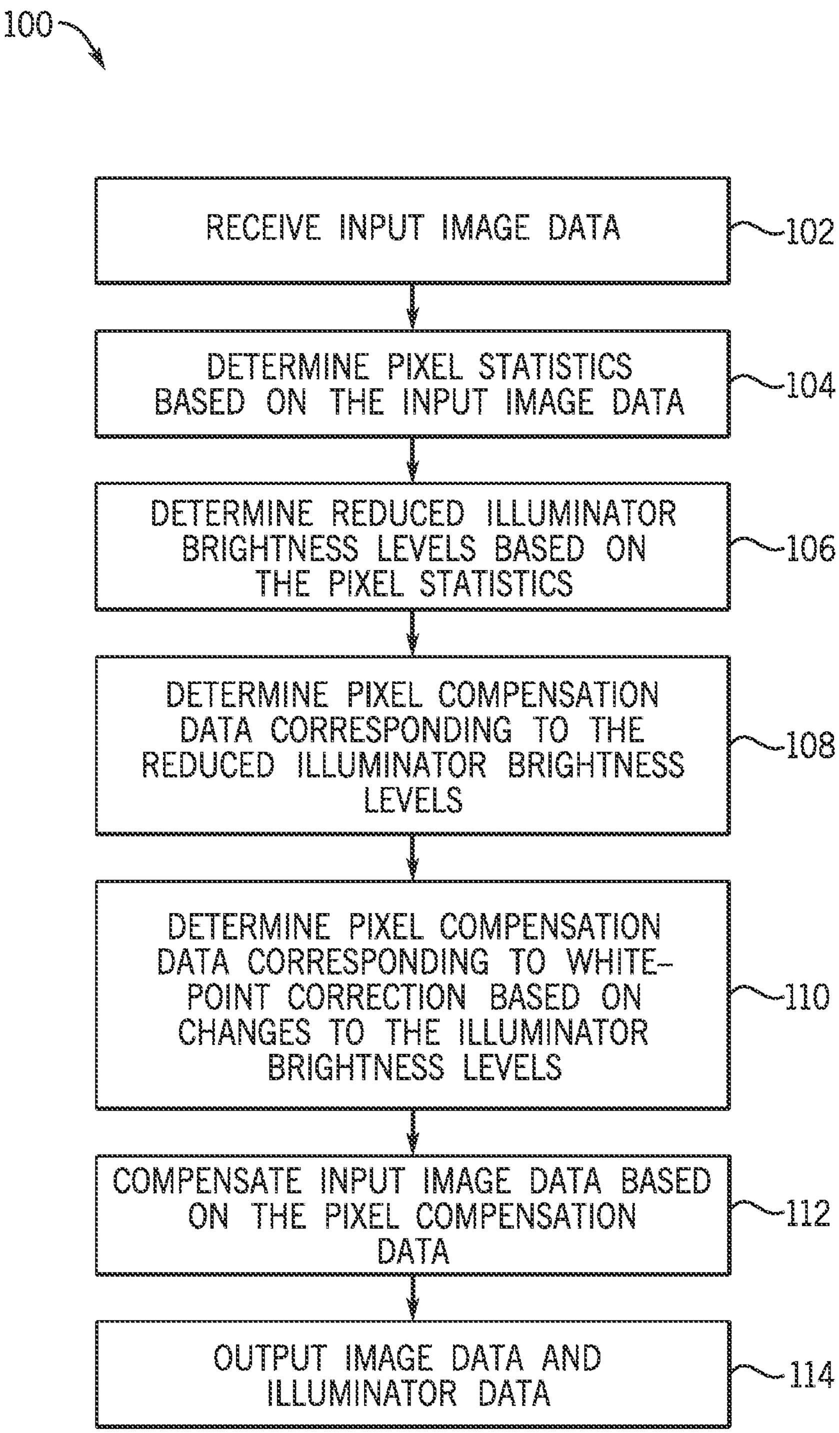
FIG. 10 is a flowchart of an example process for determining reduced illuminator brightness levels and compensating image data therefor, in accordance with an embodiment.

FIG. 10 is a flowchart 100 of an example process for determining reduced illuminator brightness levels and compensating image data therefor. For example, a PCC block 52 may receive input image data 86 (process block 102) and determine pixel statistics 88, such as the maximum luminance values of each color component, based on the input image data (process block 104). The PCC block 52 may determine reduced illuminator brightness levels (e.g., output illuminator data 94) based on the pixel statistics 88 and the input image data 86 (process block 106). Additionally, the PCC block 52 may determine pixel compensation data 90 corresponding to the reduced illuminator brightness levels (process block 108). For example, the PCC block 52 may generate pixel compensation data 90 to increase the pixel luminance values to offset the reduced illuminator brightness levels. Additionally, the PCC block 52 may the determine pixel compensation data 90 corresponding to white-point correction based on the changes to the illuminator brightness levels (process block 110). As should be appreciated, the pixel compensation data 90 may include individual or combined compensations for the reduced illuminator brightness levels and white-point correction. Moreover, the input image data 86 may be compensated based on the pixel compensation data 90 (process block 112), and the output image data 92 and the output illuminator data 94 may be output (process block 114), for example, to the electronic display 12.

Additionally, in some embodiments, different color component illuminators 62 may have different efficiencies when operated at various brightness levels. For example, a green illuminator 62B may draw less power when operating at the same brightness level as a red illuminator 62A. As such, a user interface (e.g., a graphical user interface (GUI)) and/or a color scheme thereof for the electronic device 10 may be designed with lower (e.g., in a statistical average) maximum luminance values (e.g., as determined by the statics sub-block 80) for color components of the less efficient illuminators 62. For example, if the red illuminator 62A is less efficient than the green illuminator 62B and the blue illuminator 62C, the user interface may be designed with, on average, lower maximum red luminance values than the maximum blue and green luminance values. In other words, the user interface may be designed such that the red illuminator 62A is, on average, operated at a lower brightness level than other illuminators 62B and 62C, which may further increase power savings. For example, the GUI and/or color scheme thereof may set the average maximum red luminance value to be less than the average maximum blue or green luminance values.

Although the above referenced flowchart 100 is shown in a given order, in certain embodiments, process/decision blocks may be reordered, altered, deleted, and/or occur simultaneously. Additionally, the referenced flowchart 100 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device comprising:

an electronic display configured to display an image frame based at least in part on first color component input image data and second color component input image data, the electronic display comprising:

a first illuminator configured to generate a first light at a first brightness level;

a second illuminator configured to generate a second light at a second brightness level, wherein the first illuminator and the second illuminator are different color component illuminators;

a first plurality of pixel locations configured to emit the first light from the electronic display based at least in part on a corresponding first plurality of pixel values; and a second plurality of pixel locations configured to emit the second light from the electronic display based at least in part on a corresponding second plurality of pixel values; and pixel contrast control circuitry configured to:

determine the first brightness level and the first plurality of pixel values based at least in part on the first color component input image data, wherein the first brightness level is less than a previous brightness level of the first illuminator, and wherein pixel values of the first plurality of pixel values are greater than pixel values of the first color component input image data; and determine the second brightness level and the second plurality of pixel values based at least in part on the second color component input image data.

2. The device of claim 1, wherein the pixel contrast control circuitry is configured to analyze pixel statistics of the first color component input image data, wherein analyzing the pixel statistics of the first color component input image data comprises determining a largest luminance value of the first color component input image data for the image frame.

3. The device of claim 2, wherein the pixel contrast control circuitry is configured to determine the first brightness level based at least in part on the largest luminance value of the first color component input image data for the image frame.

4. The device of claim 1, wherein determining the first plurality of pixel values comprises compensating the first plurality of pixel values for a change in white-point associated with a change in the first brightness level.

5. The device of claim 4, wherein the change in white-point is determined based at least in part on the first brightness level and the second brightness level.

6. The device of claim 1, wherein the pixel contrast control circuitry is configured to determine the first plurality of pixel values based at least in part on the determined first brightness level and determine the second plurality of pixel values based at least in part on the determined second brightness level.

7. The device of claim 1, wherein the first plurality of pixel values correspond to a respective plurality of duty cycles, wherein a duty cycle of the respective plurality of duty cycles comprises an amount of time during the image frame that the first light is emitted from a corresponding pixel location of the first plurality of pixel locations.

8. The device of claim 1, wherein the electronic display comprises a reflective technology display.

9. The device of claim 8, wherein the reflective technology display comprises a plurality of mirrors configured to direct the first light to the first plurality of pixel locations.

10. A method comprising:

receiving input image data for an image frame, the input image data comprising a first plurality of luminance values corresponding to a first color component and a second plurality of luminance values corresponding to a second color component different from the first color component;

determining a highest luminance value of the first plurality of luminance values;

reducing a brightness level of a first illuminator corresponding to the first color component based at least in part on the highest luminance value of the first plurality of luminance values; and compensating the first plurality of luminance values for the reduced brightness level of the first illuminator.

11. The method of claim 10, comprising:

determining a highest luminance value of the second plurality of luminance values;

reducing a brightness level of a second illuminator corresponding to the second color component based at least in part on the highest luminance value of the second plurality of luminance values; and compensating the second plurality of luminance values for the reduced brightness level of the second illuminator.

12. The method of claim 10, comprising compensating the first plurality of luminance values and the second plurality of luminance values for a color shift of the first illuminator based at least in part on the reduced brightness level of the first illuminator.

13. The method of claim 12, wherein compensating the first plurality of luminance values for the color shift of the first illuminator and compensating the first plurality of luminance values for the reduced brightness level of the first illuminator comprises determining combined pixel compensation data and applying the combined pixel compensation data to the first plurality of luminance values.

14. The method of claim 10, comprising:

generating, via the first illuminator of an electronic display, light at the reduced brightness level; and emitting the light at a pixel location on the electronic display based at least in part on a respective compensated luminance value of the first plurality of luminance values, wherein emitting the light at the pixel location comprises directing, via a mirror, a light guide, or both, the light from the first illuminator to the pixel location for an amount of time during the image frame, wherein the amount of time is regulated according to the respective compensated luminance value.

15. The method of claim 10, wherein the first illuminator comprises a monochromatic projector.

16. The method of claim 10, wherein compensating the first plurality of luminance values comprises compensating the first plurality of luminance values for a change in white-point associated with a change in the brightness level.

17. A system comprising:

an electronic display comprising:

a first illuminator configured to emit a first light at a first color; and a second illuminator configured to emit a second light a second color different from the first color; and image processing circuitry configured to:

receive input image data representative of images to be displayed, wherein the input image data comprises, for an image frame, a first plurality of luminance values for the first color and a second plurality of luminance values for the second color;

set a first brightness level of the first illuminator based at least in part on a highest luminance value of the first plurality of luminance values; and generate a first plurality of compensated luminance values by remapping the first plurality of luminance values in accordance with the first brightness level of the first illuminator, wherein the first plurality of compensated luminance values regulate an amount of the first light that is emitted at the first brightness level at a corresponding plurality of pixel locations, wherein perceived luminances at the corresponding plurality of pixel locations is equivalent to the first plurality of luminance values regulation of the amount of the first light at a second brightness level, higher than the first brightness level.

18. The system of claim 17, wherein the image processing circuitry is configured to set a third brightness level of the second illuminator based at least in part on a highest luminance value of the second plurality of luminance values independently of the first brightness level.

19. The system of claim 18, wherein generating the first plurality of compensated luminance values comprises compensating the first plurality of luminance values for a first color shift associated with the first illuminator at the first brightness level and a second color shift of the second illuminator at the third brightness level.

20. The system of claim 17, comprising processing circuitry configured to generate the input image data according to a graphical user interface (GUI), wherein a color scheme of the GUI sets, in a statistical average, the highest luminance value of the first plurality of luminance values to be less than a highest luminance value of the second plurality of luminance values, wherein the first illuminator consumes more power than the second illuminator at a same brightness level.

* * * * *